United States Patent [19]

Matsuoka et al.

[11] 3,905,006

[45] Sept. 9, 1975

[54] VOLTAGE DEPENDENT RESISTOR

[76] Inventors: Michio Matsuoka, 4-chome, Korigaoka, Hirakata, Osaka-fu; Gen Itakura, 3-14, Miyuki-Higashi-machi, Neyagawa, Osaka-fu; Atsushi Iga, 14-11, 1-chome, Daiwa, Takatsuki, Osaka-fu; Takeshi Masuyama, 1-3, 1-chome, Yamate-cho, Takatsuki, Osaka-fu, all of Japan

[22] Filed: Oct. 29, 1974

[21] Appl. No.: 518,944

Related U.S. Application Data

[62] Division of Ser. No. 428,737, Dec. 27, 1973.

[30] Foreign Application Priority Data

Dec. 29, 1972 Japan.................................. 48-3619
Apr. 13, 1973 Japan.............................. 48-42488
June 15, 1973 Japan.............................. 48-68066
Dec. 29, 1972 Japan.................................. 48-3610

[52] U.S. Cl. .................. 338/21; 252/518; 252/521; 338/20
[51] Int. Cl............................................. H01c 7/10
[58] Field of Search .......... 338/13, 20, 21; 252/518, 252/521; 29/182, 182.5, 610

[56] References Cited
UNITED STATES PATENTS
3,760,318   9/1973   Masuyama........................... 338/20

Primary Examiner—C. L. Albritton
Attorney, Agent, or Firm—Wenderoth, Lind & Ponack

[57] ABSTRACT

A voltage dependent resistor which has a zinc oxide sintered body which itself has voltage dependent properties. The resistor is made by the steps of: (1) providing a formed body of a powder mixture having, as a major part, zinc oxide and additive; (2) coating on the side surfaces of the formed body a paste having as the solid ingredient composition, at least one member selected from the group of (a) more than 50 mole % of silicon dioxide ($SiO_2$), and less than 50 mole % of bismuth oxide ($Bi_2O_3$), (b) the same composition as that of said additive, (c) more than 30 mole % of antimony oxide ($Sb_2O_3$) and less than 70 mole % of bismuth oxide ($Bi_2O_3$), and (d) more than 50 mole % of indium oxide ($In_2O_3$) and less than 50 mole % of bismuth oxide ($Bi_2O_3$), (3) sintering the coated body; and (4) applying electrodes to opposite surfaces of the sintered body.

2 Claims, 1 Drawing Figure

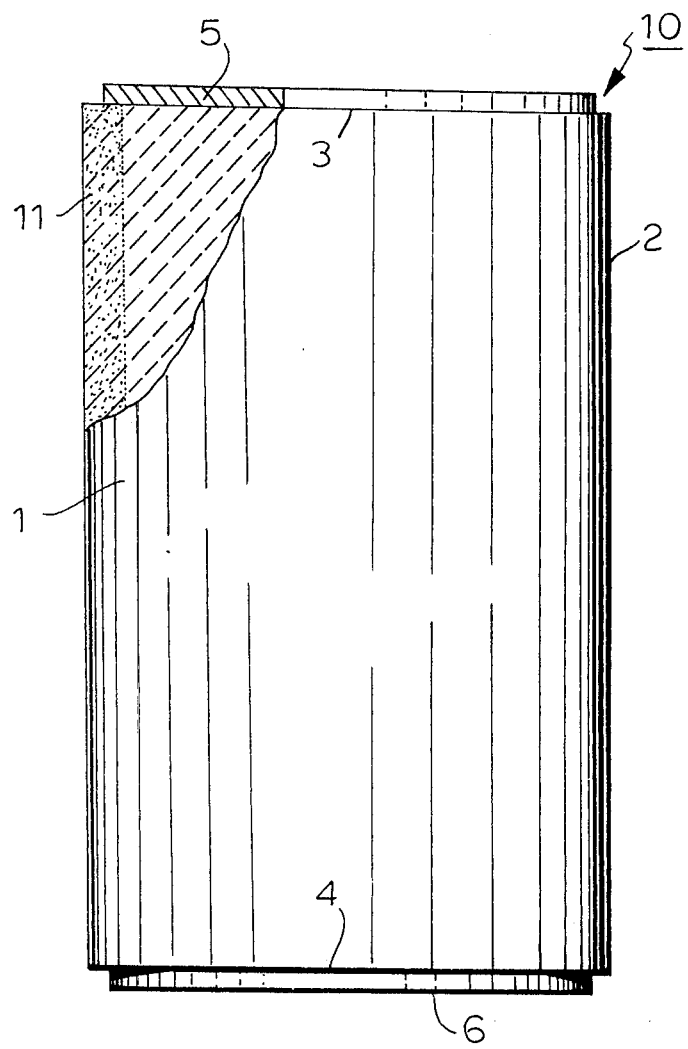

VOLTAGE DEPENDENT RESISTOR

This application is a division of application Ser. No. 428,737, filed Dec. 27, 1973.

This invention relates to the preparation of a voltage dependent resistor the properties of which are due to the bulk thereof, and more particularly to a varistor comprising a zinc oxide sintered body having a high resistance layer of a composition such as silicon dioxide, antimony oxide or indium oxide on the side surface of the sintered body.

Various voltage dependent resistors such as silicon carbide varistors, selenium rectifiers and germanium or silicon p-n junction diodes have been widely used for stabilization of voltage or current of electrical circuits. The electrical characteristics of such a voltage dependent resistor are expressed by the relation:

$$I = (V^n/C)$$

where $V$ is the voltage across the resistor, $I$ is the current flowing through the resistor, $C$ is a constant corresponding to the voltage at a given current and exponent $n$ is a numerical value greater than 1. The value of $n$ is calculated by the following equation:

$$n = \frac{\text{Log}_{10}(I_2/I_1)}{\text{Log}_{10}(V_2/V_1)}$$

where $V_1$ and $V_2$ are voltages at a given currents $I_1$ and $I_2$, respectively. The desired value of $C$ depends upon the kind of application to which the resistor is to be put. It is ordinarily desirable that the value of $n$ be as large as possible since this exponent determines the degree to which the resistors depart from ohmic characteristics.

There have been known voltage dependent resistors comprising sintered bodies of zinc oxide with or without additives and having silver paint electrodes applied thereto, as disclosed in the U.S. Pat. No. 3,496,512. The non-linearity of such voltage dependent resistors is attributed to the interface between the sintered body of zinc oxide with or without additives and the silver paint electrode and is controlled mainly by changing the composition of said sintered body and said silver paint electrode. Therefore, it is not easy to control the $C$-value over a wide range after the sintered body is prepared. Similarly, in the voltage dependent resistors comprising germanium or silicon p-n junction diodes it is difficult to control the $C$-value over a wide range because the non-linearity of these voltage dependent resistors is not attributed to the bulk thereof but to the p-n junction. On the other hand, silicon carbide varistors have non-linearity due to the contacts among individual grains of silicon carbide bonded together by a ceramic binding material, i.e., to the bulk and are controlled with respect to the $C$-value by changing the dimension in the direction in which the current flows through the varistors. The silicon carbide varistors, however, have a relatively low $n$-value ranging from 3 to 6 and are prepared by firing in a non-oxidizing atmosphere, especially for the purpose of obtaining a lower $C$-value. In U.S. Pat. Nos. 3,663,458, 3,669,058, 3,637,529, 3,632,528, 3,634,337 and 3,598,763, there have been disclosed voltage dependent resistors comprising sintered bodies of zinc oxide with additives such as bismuth oxide, uranium oxide, strontium oxide, lead oxide, barium oxide, cobalt oxide and manganese oxide. The non-linearity of such voltage dependent resistors is attributable to the bulk thereof and is independent of the interface between the sintered bodies and the electrodes. Therefore, it is easy to control the $C$-value over a wide range by changing the thickness of the sintered body itself. Such voltage dependent resistors of the bulk type have more excellent properties with respect to the n-value, transient power dissipation and AC power dissipation than do SiC varistors.

A disadvantage of the zinc oxide voltage-dependent resistors is their poor stability in an electric load life test in a high ambient humidity. When D.C. power is applied to the zinc oxide sintered body in a high ambient humidity, the sintered body shows a decrease in the surface electrical resistance. This decrease causes in particular an increase in the leakage current in the zinc oxide voltage-dependent resistor of the bulk type and results in a poor non-linear property. The deterioration of the non-linear property of the voltage-dependent resistor occurs even at a load of low power such as a load lower than 0.01 watt in a high ambient humidity, for example 90 % R.H. at 70°C. Therefore, it is necessary that the sintered body is completely protected against outside moisture by a protective coating.

Another disadvantage of the zinc oxide voltage dependent resistors aforesaid exists in their poor ability to withstand impulse current. When an impulse wave is applied to the zinc oxide sintered body, the sintered body suffers a flashover along its side surface at an impulse voltage above 500V/mm, and despite no deterioration in the interior of sintered body the side surface of the sintered body is heavily damaged. The ability to withstand impulse current is unfavorable particularly for application of the varistor as a lightning arrester.

There is other prior art that relates to a voltage dependent resistor comprising a sintered body comprising a zinc oxide and other additives and being characterized by a high $C$-value, high $n$-value, high stability with respect to temperature, humidity and electric load, and good ability to withstand impulse current. Such a resistor is disclosed in U.S. Pat. No. 3,760,318. More specifically, a zinc oxide sintered body according to said U.S. Pat. No. 3,760,318 has Li ions or Na ions diffused into said sintered body from the side surface thereof at a temperature of 600°C to 1,000°C. This diffusing process inevitably results in lowering the $n$-value of the resultant resistor in the current region is undesirable for an application requiring low leakage current.

An object of the present invention is to provide a method for making a voltage dependent resistor characterized by a high stability with repect to a d.c. load in high humidity and a good ability to withstand impulse current.

Another object of the present invention is to provide a method for making a voltage dependent resistor characterized by a high $n$-value even in a low current region and a high stability with respect to a d.c. load in high humidity and a good ability to withstand impulse current.

These and other objects of the invention will become apparent upon consideration of the following description taken together with the accompanying drawing in which the single FIGURE is a partly cross-sectional vies of a voltage-dependent resistor in accordance with the invention.

Before proceeding with a detailed description of the manufacturing process for the voltage-dependent resistor contemplated by the invention, the construction of the resultant resistor will be described with reference to the aforesaid FIGURE wherein reference character 10 designates, as a whole, a voltage-dependent resistor comprising, as its active element, a sintered body having surfaces consisting of a side surface 2 and opposite end surfaces 3 and 4 to which a pair of electrodes 5 and 6 are applied. Said sintered body 1 is prepared in a manner hereinafter set forth and has a high resistance layer 11 at said side surface 2 and can have any cross-sectional form such as circular, square or rectangular.

The process for making a voltage dependent resistor of a bulk type characterized by a high humidity resistance and a good ability to withstand current surges according to the invention comprises: (1) providing a formed body of a powder mixture comprising, as a major part, zinc oxide and an additive including $Bi_2O_3$; (2) coating on the side surfaces of said body a paste comprising, as the solid ingredient composition, at least one member selected from the group consisting of (a) more than 50 mole % of silicon dioxide ($SiO_2$) and less than 50 mole % of bismuth oxide ($Bi_2O_3$), (b) the same composition as that of said additive, (c) more than 30 mole % of antimony oxide ($Sb_2O_3$) and less than 70 mole % of bismuth oxide ($Bi_2O_3$), and (d) more than 50 mole % of indium oxide ($In_2O_3$); (3) sintering said coated body; and (4) applying two electrodes to the opposite end surfaces of said sintered body.

Said zinc oxide sintered body which itself has voltage dependent properties can be prepared by using a composition described in U.S. Pat. Nos. 3,663,458, 3,669,058, 3,636,529, 3,632,528, 3,634,337 and 3,598,763. Among various compositions, greater result can be obtained with a composition consisting essentially of, as a major part, 80.0 to 99.9 mole % of zinc oxide and, as an additive, 0.05 to 10.0 mole %, in total, of at least one member selected from the group consisting of cobalt oxide (CoO), manganese oxide (MnO), antimony oxide ($Sb_2O_3$), barium oxide (BaO), strontium oxide (SrO) and lead oxide (PbO).

According to the present invention, the resultant resistor has an excellent ability to withstand current surges in an impulse current test, when said coating paste comprises, as the solid ingredient composition, 70 to 95 mole % of silicon dioxide ($SiO_2$) and 30 to 5 mole % of bismuth oxide ($Bi_2O_3$). Similarly, the ability to withstand surge current can be improved greatly by using coating paste comprising, as the solid ingredient composition, 70 to 95 mole % of antimony oxide ($Sb_2O_3$).

According to the present invention, the ability to withstand surge current can be further improved by using coating paste comprising, as the solid ingredient composition, 50 to 95 mole % of silicon dioxide ($SiO_2$), 2 to 45 mole % of antimony oxide ($Sb_2O_3$) and 2 to 20 mole % of bismuth oxide ($Bi_2O_3$).

It has been discovered according to the invention that the D.C. stability in high humidity and the ability to withstand surge current of the resultant resistor is improved when said powder mixture consists essentially of, as a major part, 99.9 to 80.0 mole % of zinc oxide (ZnO) and, as an additive, 0.05 to 10.0 mole % of bismuth oxide ($Bi_2O_3$) and 0.05 to 10.0 mole %, in total, of at least one member selected from the group consisting of cobalt oxide (CoO), manganese oxide (MnO) antimony oxide ($Sb_2O_3$), barium oxide (BaO), strontium oxide (SrO) and lead oxide (PbO).

The sintered body 1 can be prepared by a per se well known ceramic technique. The starting materials comprising zinc oxide powder and additives such as bismuth oxide, cobalt oxide, manganese oxide, antimony oxide, barium oxide, strontium oxide, lead oxide, uranium oxide and tin oxide are mixed in a wet mill so as to produce a homogeneous mixture. The mixtures are dried and pressed in a mold into desired shapes at a pressure from 100 kg/cm² to 1,000 mg/cm². When a rod-shaped resistor is desired, the mixed slurry can be fabricated into the desired shape by extruding and then dried. The mixtures may be preliminarily calcined at a temperature of 700° to 1,000°C and pulverized for easy fabrication in the subsequent pressing step. The mixtures may be admixed with a suitable binder such as water, polyvinyl alcohol, etc.

After the mixtures are formed into the desired shapes, the formed bodies are coated, on the side surfaces, with a paste including powder having the same composition as said additive, or a combination of bismuth oxide with silicon dioxide, antimony oxide or indium oxide, so as to form a high resistence layer at the side surfaces after sintering. Said paste comprises, as the solid ingredient composition at least one member selected from the group consisting of (a) more than 50 mole % of silicon dioxide ($SiO_2$) and less than 50 mole % of bismuth oxide ($Bi_2O_3$), (b) the same composition as that of said additive, (c) more than 30 mole % of antimony oxide ($Sb_2O_3$) and less than 70 mole % of bismuth oxide ($Bi_2O_3$), and (d) more than 50 mole % of indium oxide ($In_2O_3$) and less than 50 mole % of bismuth oxide ($Bi_2O_3$), and as a binding material, an organic resin such as epoxy, vinyl or phenol resin in an organic solvent such as butyl acetate, toluene or the like. Said silicon dioxide, bismuth oxide, antimony oxide and indium oxide can be replaced, respectively, with any silicon compound, bismuth compound, antimony compound and indium compound such as an oxalate, carbonate, nitrate, sulfate, iodide, fluoride or hydroxide which is converted into the corresponding oxide at the sintering temperature.

After being coated with said paste, the formed bodies are sintered in air at a temperature of 100° to 1,450°C for 1 to 5 hours, and then furnace cooled to room temperature. The sintering temperature is determined based on the desired electrical resistivity, nonlinearity stability and the thickness of the high resistance layer formed at the side surface of the sintered body. Also, the electrical resistivity can be reduced by air-quenching from the sintering temperature to room temperature. The sintered body has non-ohmic resistance due to the bulk itself. Therefore, its C-value can be changed without impairing the n-value by changing the distance between said opposite end surfaces. A shorter distance results in a lower C-value. The coating paste forms a high resistance layer, as can be proved by measurement of the resistance distribution in the cross-section of the sintered body, which will show a high resistance at the side surface of the sintered body. The high resistance layer is controlled so as to have a thickness more than $10\mu$. Particularly, it can be shown from an x-ray analysis of the cross-sectional portion of sintered body, that the paste comprising a combination of silicon dioxide and bismuth oxide, or antimony oxide and bismuth oxide forms a layer having a thickness of more than $3\mu$ and that said layer comprises, in a region to a $3\mu$ depth from the side surface, more than 70 mole % of at least zinc silicate ($Zn_2SiO_4$) and/or zinc antimonate $Zn_7Sb_2O_{12}$).

After sintering the sintered body has electrodes applied to the opposite end surfaces of the sintered body. Said electrodes can be made by any available method such as heating of noble metal paint, electroless or electrolytic plating of Ag, Cu, Ni, Sn etc. vacuum evaporating of Al, Zn, Sn etc. and flame spraying of Cu, Sn, Al, Zn etc. in accordance with the prior well-known techniques.

Lead wires can be attached to the electrodes in a per se conventional manner by using conventional manner by using conventional solder. It is convenient to employ a conductive adhesive comprising silver powder and resin in an organic solvent in order to connect the lead wires to the silver electrodes. The $n$-value of a voltage dependent resistor according to this invention does not deteriorate even in a low current region due to the introduction of the covering layer at the side surface of the sintered body, and it has a high stability with respect to temperature and humidity and in the load life test, which is carried out at 70°C, 90 % RH at a rating power for 500 hours. The $n$-value and $C$-value do not change appreciably after the load life test. From a surge test, which is carried out by applying a $4 \times 10\mu$ sec impulse current twice, it is shown that this voltage-dependant resistor has the ability to withstand more than $2,000 A/cm^2$.

EXAMPLE 1

Starting materials listed in Table 1 were mixed in a wet mill for 5 hours. Each mixture was dried and pressed in a mold into a disc of 40 mm in diameter and 25 mm in thickness at a pressure of 340 $kg/cm^2$. The pressed bodies had the side surface covered by coating paste including solid ingredients listed in Table 1 and were dried. Then, the bodies were sintered in air for 5 hours at 1,200°C and furnace-cooled. The sintered bodies were lapped to the thickness listed in Table 1 by lapping the opposite end surfaces thereof with silicon carbide abrasive having a particle size of 600 mesh. The opposite end surfaces of the sintered discs were provided with a spray metallized film of aluminum by a per se well-known technique. The electric characteristics of the resultant resistors are shown in Table 1. It will be readily understood that the $C$-value changes in proportion to the thickness of the sintered body.

Size of disc: 32 mm in dia.

Thickness of high resistive layer: $30\mu$

Table 1

| Composition of Sintered Body (mol. %) | Solid Ingredient of Paste (mol. %) | Thickness of Sintered Body (mm) | C(V) (at 1mA) | n (0.1–1mA) |
|---|---|---|---|---|
| ZnO (99.0) Bi$_2$O$_3$ (0.5) CoO (0.5) | SiO$_2$ (50) Bi$_2$O$_3$ (50) | 5 | 150 | 15 |
| | | 10 | 302 | 14 |
| | | 20 | 605 | 15 |
| | SiO$_2$ (90) Bi$_2$O$_3$ (10) | 5 | 153 | 15 |
| | | 10 | 310 | 16 |
| | | 20 | 605 | 16 |
| | SiO$_2$ (100) Bi$_2$O$_3$ (0) | 5 | 155 | 14 |
| | | 10 | 310 | 15 |
| | | 20 | 615 | 15 |
| | Sb$_2$O$_3$ (90) Bi$_2$O$_3$ (10) | 5 | 150 | 15 |
| | | 10 | 300 | 15 |
| | | 20 | 603 | 15 |
| | In$_2$O$_3$ (90) Bi$_2$(0.5) (10) | 5 | 145 | 14 |
| | | 10 | 300 | 14 |
| | | 20 | 600 | 15 |
| | SiO$_2$ (72) Sb$_2$O$_3$ (20) Bi$_2$O$_3$ (8) | 5 | 160 | 16 |
| | | 10 | 315 | 16 |
| | | 20 | 615 | 16 |
| ZnO (97.5) Bi$_2$O$_3$ (0.5) CoO (0.5) MnO (0.5) Sb$_2$O$_3$ (1.0) | SiO$_2$ (90) Bi$_2$O$_3$ (10) | 5 | 510 | 44 |
| | | 10 | 1025 | 45 |
| | | 20 | 2040 | 45 |
| | Sb$_2$O$_3$ (90) Bi$_2$O$_3$ (10) | 5 | 500 | 45 |
| | | 10 | 1010 | 45 |
| | | 20 | 2010 | 46 |
| | In$_2$O$_3$ (90) Bi$_2$O$_3$ (10) | 5 | 505 | 45 |
| | | 10 | 1010 | 44 |
| | | 20 | 2015 | 46 |
| | SiO$_2$ (72) Sb$_2$O$_3$ (20) Bi$_2$O$_3$ (8) | 5 | 515 | 46 |
| | | 10 | 1025 | 46 |
| | | 20 | 2040 | 46 |
| ZnO (99.0) Bi$_2$O$_3$ (0.5) MnO (0.5) | Sb$_2$O$_3$ (90) Bi$_2$O$_3$ (10) | 5 | 250 | 22 |
| | | 10 | 505 | 22 |
| | | 20 | 1000 | 23 |

Table 1 – Continued

| Composition of Sintered Body (mol. %) | | Solid Ingredient of Paste (mol. %) | | Thickness of Sintered Body (mm) | C(V) (at 1mA) | n (0.1–1mA) |
|---|---|---|---|---|---|---|
| ZnO | (99.0) | SiO$_2$ | (90) | 5 | 240 | 8.2 |
| Bi$_2$O$_3$ | (0.5) | Bi$_2$O$_3$ | (10) | 10 | 490 | 8.4 |
| Sb$_2$O$_3$ | (0.5) | | | 20 | 985 | 8.4 |
| ZnO | (99.0) | In$_2$O$_3$ | (90) | 5 | 200 | 10 |
| Bi$_2$O$_3$ | (0.5) | Bi$_2$O$_3$ | (10) | 10 | 410 | 10 |
| BaO | (0.5) | | | 20 | 815 | 10 |
| ZnO | (99.0) | SiO$_2$ | (72) | 5 | 205 | 11 |
| Bi$_2$O$_3$ | (0.5) | Sb$_2$O$_3$ | (20) | 10 | 400 | 11 |
| SrO | (0.5) | Bi$_2$O$_3$ | (8) | 20 | 810 | 12 |

EXAMPLE 2

Starting materials of Table 2 were fabricated into voltage dependent resistors by the same process as that of Example 1. An impulse test was carried out by applying a 4 × 10 μs impulse and the ability to withstand current surge was thus determined. A humidity test was carried out by boiling the disc in pure water for 24 hours. The electric characteristics of the resultant resistors are shown in Table 2.

Size of disc: 32 mm in dia. and 20 mm in thickness
Sintering: 1,200°C for 5 hours
Thickness of high resistance layer: 30μ

Table 2

| Composition of Sintered Body (mol. %) | | Solid Ingredient of Paste (mol %) | | | | Electric Characteristics of Resultant Resistor | | | |
|---|---|---|---|---|---|---|---|---|---|
| | | | | | | C(V) (at 1mA) | n 0.1–1mA | Impulse Withstand, (KA) | Boiling Test ΔC (%) |
| | | SiO$_2$ | (50) | Bi$_2$O$_3$ | (50) | 605 | 15 | 20 | -5.0 |
| | | SiO$_2$ | (60) | Bi$_2$O$_3$ | (40) | 605 | 15 | 20 | -4.7 |
| | | SiO$_2$ | (70) | Bi$_2$O$_3$ | (30) | 600 | 15 | 25 | -4.7 |
| | | SiO$_2$ | (80) | Bi$_2$O$_3$ | (20) | 600 | 16 | 30 | -3.8 |
| | | SiO$_2$ | (90) | Bi$_2$O$_3$ | (10) | 605 | 16 | 35 | -2.9 |
| | | SiO$_2$ | (95) | Bi$_2$O$_3$ | (5) | 610 | 16 | 30 | -3.2 |
| | | SiO$_2$ | (100) | Bi$_2$O$_3$ | (0) | 615 | 15 | 30 | -3.5 |
| | | Sb$_2$O$_3$ | (30) | Bi$_2$O$_3$ | (70) | 600 | 14 | 20 | -5.3 |
| ZnO | (99.0) | Sb$_2$O$_3$ | (50) | Bi$_2$O$_3$ | (50) | 600 | 14 | 25 | -4.5 |
| Bi$_2$O$_3$ | (0.5) | Sb$_2$O$_3$ | (70) | Bi$_2$O$_3$ | (30) | 600 | 15 | 25 | -3.5 |
| CoO | (0.5) | Sb$_2$O$_3$ | (90) | Bi$_2$O$_3$ | (10) | 603 | 15 | 35 | -2.7 |
| | | Sb$_2$O$_3$ | (95) | Bi$_2$O$_3$ | (5) | 605 | 15 | 30 | -3.0 |
| | | Sb$_2$O$_3$ | (100) | Bi$_2$O$_3$ | (0) | 610 | 14 | 25 | -3.3 |
| | | In$_2$O$_3$ | (50) | Bi$_2$O$_3$ | (50) | 595 | 14 | 20 | -5.7 |
| | | In$_2$O$_3$ | (70) | Bi$_2$O$_3$ | (30) | 600 | 14 | 25 | -4.3 |
| | | In$_2$O$_3$ | (90) | Bi$_2$O$_3$ | (10) | 600 | 15 | 35 | -3.1 |
| | | In$_2$O$_3$ | (95) | Bi$_2$O$_3$ | (5) | 600 | 15 | 30 | -3.4 |
| | | In$_2$O$_3$ | (100) | Bi$_2$O$_3$ | (0) | 610 | 14 | 30 | -3.5 |
| | | SiO$_2$ | (50) | Bi$_2$O$_3$ | (50) | 1960 | 42 | 25 | -5.5 |
| | | SiO$_2$ | (60) | Bi$_2$O$_3$ | (40) | 1980 | 42 | 30 | -4.8 |
| | | SiO$_2$ | (70) | Bi$_2$O$_3$ | (30) | 2000 | 44 | 35 | -3.9 |
| | | SiO$_2$ | (80) | Bi$_2$O$_3$ | (20) | 2100 | 44 | 40 | -3.2 |
| | | SiO$_2$ | (90) | Bi$_2$O$_3$ | (10) | 2040 | 45 | 40 | -1.5 |
| | | SiO$_2$ | (95) | Bi$_2$O$_3$ | (5) | 2040 | 45 | 35 | -2.1 |
| SnO | (97.5) | SiO$_2$ | (100) | Bi$_2$O$_3$ | (0) | 2030 | 44 | 30 | -2.3 |
| Bi$_2$O$_3$ | (0.5) | Sb$_2$O$_3$ | (30) | Bi$_2$O$_3$ | (70) | 1980 | 44 | 25 | -5.1 |
| CoO | (0.5) | Sb$_2$O$_3$ | (50) | Bi$_2$O$_3$ | (50) | 2000 | 44 | 30 | -4.9 |
| MnO | (0.5) | Sb$_2$O$_3$ | (70) | Bi$_2$O$_3$ | (30) | 2000 | 45 | 35 | -3.8 |
| Sb$_2$O$_3$ | (1.0) | Sb$_2$O$_3$ | (90) | Bi$_2$O$_3$ | (10) | 2010 | 46 | 40 | -2.5 |
| | | Sb$_2$O$_3$ | (95) | Bi$_2$O$_3$ | (5) | 2015 | 45 | 40 | -3.1 |
| | | Sb$_2$O$_3$ | (100) | Bi$_2$O$_3$ | (0) | 2020 | 45 | 30 | -3.5 |
| | | In$_2$O$_3$ | (50) | Bi$_2$O$_3$ | (50) | 1990 | 44 | 25 | -5.3 |
| | | In$_2$O$_3$ | (70) | Bi$_2$O$_3$ | (30) | 2005 | 44 | 30 | -4.9 |
| | | In$_2$O$_3$ | (90) | Bi$_2$O$_3$ | (10) | 2015 | 46 | 40 | -3.1 |
| | | In$_2$O$_3$ | (95) | Bi$_2$O$_3$ | (5) | 2015 | 45 | 40 | -3.4 |
| | | In$_2$O$_3$ | (100) | Bi$_2$O$_3$ | (0) | 2000 | 45 | 25 | -3.4 |
| | | SiO$_2$ | | Sb$_2$O$_3$ | | Bi$_2$O$_3$ | | | |
| | | 50 | | 45 | | 5 | 600 | 15 | 30 | -4.4 |
| ZnO | (99.0) | 50 | | 30 | | 20 | 600 | 15 | 30 | -4.8 |
| Bi$_2$O$_3$ | (0.5) | 95 | | 3 | | 2 | 615 | 16 | 35 | -3.2 |
| CoO | (0.5) | 95 | | 2 | | 3 | 615 | 16 | 40 | -3.4 |
| | | 58 | | 40 | | 2 | 610 | 15 | 35 | -3.0 |
| | | 78 | | 2 | | 20 | 610 | 15 | 40 | -2.5 |
| | | 72 | | 20 | | 8 | 620 | 17 | 45 | -1.7 |
| | | 50 | | 45 | | 5 | 2050 | 44 | 40 | -3.4 |
| ZnO | (97.5) | 50 | | 30 | | 20 | 2065 | 45 | 45 | -2.8 |
| Bi$_2$O$_3$ | (0.5) | 95 | | 3 | | 2 | 2045 | 45 | 50 | -2.7 |
| CoO | (0.5) | 95 | | 2 | | 3 | 2075 | 46 | 50 | -2.7 |
| MnO | (0.5) | 58 | | 40 | | 2 | 2060 | 44 | 50 | -2.0 |
| Sb$_2$O$_3$ | (1.0) | 78 | | 2 | | 20 | 2080 | 46 | 55 | -1.2 |
| | | 72 | | 20 | | 8 | 2100 | 48 | 60 | -0.5 |

EXAMPLE 3

Starting materials of Table 3 were fabricated into voltage dependent resistors by the same process as that of Example 1. Then the tests were carried out by the same methods as those of Example 2. The electric characteristics of the resultant resistors are shown in Table 3.

Size of disc: 32 mm in dia. and 20 mm in thickness
Sintering: 1,200°C for 5 hours
Thickness of high resistance layer: 30$\mu$ Table 3

| Composition of Sintered Body (mol %) | | | | Solid Ingredient of Paste (mol %) | | Electric Characteristics of Resultant Resistor | | | |
|---|---|---|---|---|---|---|---|---|---|
| ZnO | $Bi_2O_3$ | Further Additives | | | | C(V) (at 1mA) | n 0.1–1mA | Impulse withstand (KA) | Boiling Test ΔC(%) |
| 99.90 | 0.05 | CoO | 0.05 | | | 350 | 10 | 15 | -6.2 |
| 89.95 | 0.05 | CoO | 10 | $SiO_2$ | (90) | 420 | 12 | 18 | -6.2 |
| 89.95 | 10 | CoO | 0.05 | $Bi_2O_3$ | (10) | 420 | 13 | 20 | -3.9 |
| 80.00 | 10 | CoO | 10 | | | 750 | 14 | 20 | -4.0 |
| 99.0 | 0.5 | CoO | 0.5 | | | 605 | 16 | 35 | -6.3 |
| 99.90 | 0.05 | MnO | 0.05 | | | 500 | 13 | 15 | -6.3 |
| 89.95 | 0.05 | MnO | 10 | | | 600 | 14 | 15 | -5.9 |
| 89.95 | 10 | MnO | 0.05 | $Sb_2O_3$ | (90) | 900 | 18 | 25 | -3.3 |
| 80.00 | 10 | MnO | 10 | $Bi_2O_3$ | (10) | 1250 | 17 | 25 | -3.5 |
| 99.0 | 0.5 | MnO | 0.5 | | | 1000 | 23 | 35 | -2.8 |
| 99.90 | 0.05 | $Sb_2O_3$ | 0.05 | | | 300 | 7.9 | 15 | -7.0 |
| 89.95 | 0.05 | $Sb_2O_3$ | 10 | $In_2O_3$ | (90) | 800 | 7.2 | 15 | -5.5 |
| 89.95 | 10 | $Sb_2O_3$ | 0.05 | $Bi_2O_3$ | (10) | 720 | 8.2 | 17 | -3.9 |
| 80.00 | 10 | $Sb_2O_3$ | 10 | | | 1300 | 8.6 | 18 | -4.2 |
| 99.0 | 0.5 | $Sb_2O_3$ | 0.5 | | | 990 | 8.4 | 25 | -2.0 |
| 99.90 | 0.05 | BaO | 0.05 | | | 320 | 7.2 | 18 | -5.3 |
| 89.95 | 0.05 | BaO | 10 | $SiO_2$ | (90) | 470 | 8.0 | 15 | -4.9 |
| 89.95 | 10 | BaO | 0.05 | $Bi_2O_3$ | (10) | 510 | 9.4 | 20 | -2.9 |
| 80.00 | 10 | BaO | 10 | | | 1200 | 0.5 | 20 | -3.4 |
| 99.0 | 0.5 | BaO | 0.5 | | | 815 | 10 | 25 | -2.5 |
| 99.90 | 0.05 | SrO | 0.05 | | | 300 | 9.2 | 12 | -7.2 |
| 89.95 | 0.05 | SrO | 10 | $Sb_2O_3$ | (90) | 1150 | 8.1 | 14 | -5.7 |
| 89.95 | 10 | SrO | 0.05 | $Bi_2O_3$ | (10) | 1200 | 11 | 17 | -4.3 |
| 80.00 | 10 | SrO | 10 | | | 1400 | 11 | 18 | -4.5 |
| 99.0 | 0.5 | SrO | 0.5 | | | 810 | 12 | 20 | -3.3 |
| 98.5 | 0.5 | CoO MnO | 0.5 0.5 | | | 850 | 27 | 45 | -3.5 |
| 98.5 | 0.5 | CoO $Sb_2O_3$ | 0.5 0.5 | | | 1700 | 40 | 50 | -4.2 |
| 98.5 | 0.5 | CoO BaO | 0.5 0.5 | | | 1000 | 22 | 35 | -4.5 |
| 98.5 | 0.5 | CoO SrO | 0.5 0.5 | | | 950 | 25 | 40 | -5.3 |
| 98.5 | 0.5 | MnO $Sb_2O_3$ | 0.5 0.5 | $SiO_2$ $Sb_2O_3$ $Bi_2O_3$ | (72) (20) (8) | 1800 | 40 | 50 | -4.7 |
| 98.5 | 0.5 | MnO BaO | 0.5 0.5 | | | 1300 | 32 | 40 | -3.8 |
| 98.5 | 0.5 | MnO SrO | 0.5 0.5 | | | 1250 | 30 | 40 | -3.8 |
| 98.5 | 0.5 | $Sb_2O_3$ BaO | 0.5 0.5 | | | 1300 | 20 | 30 | -4.7 |
| 98.5 | 0.5 | $Sb_2O_3$ SrO | 0.5 0.5 | | | 1220 | 20 | 30 | -5.2 |
| 98.5 | 0.5 | BaO SrO | 0.5 0.5 | | | 750 | 17 | 25 | -7.0 |
| 98.0 | 0.5 | CoO MnO $Sb_2O_3$ | 0.5 0.5 0.5 | | | 1800 | 40 | 50 | -1.5 |
| 98.0 | 0.5 | CoO MnO BaO | 0.5 0.5 0.5 | | | 800 | 29 | 35 | -2.5 |
| 98.0 | 0.5 | CoO MnO SrO | 0.5 0.5 0.5 | | | 770 | 26 | 35 | -3.0 |
| 98.0 | 0.5 | CoO $Sb_2O_3$ BaO | 0.5 0.5 0.5 | | | 1500 | 33 | 40 | -2.7 |
| 98.0 | 0.5 | CoO $Sb_2O_3$ SrO | 0.5 0.5 0.5 | $SiO_2$ $Sb_2O_3$ $Bi_2O_3$ | (72) (20) (8) | 1450 | 31 | 35 | -2.2 |
| 98.0 | 0.5 | CoO BaO SrO | 0.5 0.5 0.5 | | | 880 | 18 | 25 | -3.3 |
| 98.0 | 0.5 | MnO $Sb_2O_3$ BaO | 0.5 0.5 0.5 | | | 1650 | 35 | 40 | -3.1 |
| 98.0 | 0.5 | MnO $Sb_2O_3$ SrO | 0.5 0.5 0.5 | | | 1600 | 33 | 40 | -2.4 |
| 98.0 | 0.5 | MnO BaO SrO | 0.5 0.5 0.5 | | | 1000 | 21 | 35 | -2.5 |
| 98.0 | 0.5 | $Sb_2O_3$ BaO SrO | 0.5 0.5 0.5 | | | 1050 | 18 | 30 | -3.0 |

EXAMPLE 4

The fabrication process and testing method were the same as those of Example 2 and the thickness of the high resistance layer was varied with the results as shown in Table 4. It is easily understood that the ability to withstand impulses increases with an increase in the thickness of the high resistance layer and the rate of change of the C-value caused by the boiling test decreases with an increase of thickness of the high resistance layer.

Size of disc: 32 mm in dia. and 20 mm in thickness
Sintering: 1,200°C for 5 hours

EXAMPLE 5

Starting materials of Table 5 were fabricated into voltage dependent resistors by the same process as in Example 1. The pressed bodies were sintered at a temperature between 1,000°C to 1,450°C for 5 hours after covering the side surface with coating pastes as listed in Table 5. The test conditions were the same as those of Example 2. The electric characteristics of resulting resistors are shown in Table 5.

Size of disc: 32 mm in dia. and 20 mm.
Thickness of high resistive layer; 30μ.

Table 4

| Composition of Sintered Body (mol %) | Solid Ingredient of Paste (mol %) | | Thickness of High-Resistive layer (μ) | Electric Characteristics of Resultant Resistor | | | Boiling Test ΔC (%) |
|---|---|---|---|---|---|---|---|
| | | | | C(V) (at 1mA) | n 0.1–1 mA | Impulse Withstand (KA) | |
| ZnO (99.0) Bi$_2$O$_3$ (0.5) CoO (0.5) | SiO$_2$ (90) Bi$_2$O$_3$ (10) | | 10 | 600 | 16 | 30 | -4.3 |
| | | | 30 | 605 | 16 | 35 | -2.9 |
| | | | 100 | 605 | 16 | 40 | -3.2 |
| | | | 300 | 615 | 16 | 50 | -1.2 |
| | Sb$_2$O$_3$ (90) Bi$_2$O$_3$ (10) | | 10 | 600 | 14 | 30 | -4.2 |
| | | | 30 | 603 | 15 | 35 | -2.7 |
| | | | 100 | 605 | 15 | 40 | -2.2 |
| | | | 300 | 610 | 15 | 45 | -1.7 |
| | In$_2$O$_3$ (90) Bi$_2$O$_3$ (10) | | 10 | 590 | 15 | 25 | -4.8 |
| | | | 30 | 600 | 15 | 35 | -3.1 |
| | | | 100 | 605 | 15 | 40 | -3.3 |
| | | | 300 | 610 | 16 | 45 | -2.7 |
| | SiO$_2$ (72) Sb$_2$O$_3$ (20) Bi$_2$O$_3$ (8) | | 10 | 605 | 17 | 35 | -3.3 |
| | | | 30 | 620 | 17 | 45 | -1.7 |
| | | | 100 | 620 | 17 | 50 | -1.2 |
| | | | 300 | 630 | 18 | 60 | -1.0 |
| ZnO (97.5) Bi$_2$O$_3$ (0.5) CoO (0.5) MnO (0.5) Sb$_2$O$_3$ (1.0) | SiO$_2$ (90) Bi$_2$O$_3$ (10) | | 10 | 2000 | 43 | 30 | -2.1 |
| | | | 30 | 2040 | 45 | 40 | -1.5 |
| | | | 100 | 2070 | 45 | 45 | -1.1 |
| | | | 300 | 2100 | 46 | 45 | -0.5 |
| | Sb$_2$O$_3$ (90) Bi$_2$O$_3$ (10) | | 10 | 1950 | 43 | 30 | -3.3 |
| | | | 30 | 2010 | 46 | 40 | -2.5 |
| | | | 100 | 2030 | 46 | 40 | -2.0 |
| | | | 300 | 2050 | 46 | 50 | -1.6 |
| | In$_2$O$_3$ (90) Bi$_2$O$_3$ (10) | | 10 | 2000 | 44 | 30 | -4.7 |
| | | | 30 | 2015 | 46 | 40 | -3.1 |
| | | | 100 | 2050 | 46 | 55 | -2.2 |
| | | | 300 | 2100 | 47 | 60 | -1.8 |
| | SiO$_2$ (72) Sb$_2$O$_3$ (20) Bi$_2$O$_3$ (8) | | 10 | 2050 | 46 | 50 | -1.2 |
| | | | 30 | 2100 | 48 | 60 | -0.5 |
| | | | 100 | 2120 | 50 | 70 | -0.5 |
| | | | 300 | 2150 | 50 | 80 | -0.4 |

Table 5

| Composition of Sintered Body (mol. %) | Solid Ingredient of Paste (mol. %) | | Sintering Temp. (°C) | Electric Characteristics of Resultant Resistor | | | Boiling Test ΔC(%) |
|---|---|---|---|---|---|---|---|
| | | | | C (V) (at 1 mA) | n 0.1–1 mA | Impulse Withstand | |
| ZnO (99.0) Bi$_2$O$_3$ (0.5) CoO (0.5) | SiO$_2$ (50) Bi$_2$O$_3$ (50) | | 1000 | 1200 | 11 | 15 | -9.5 |
| | | | 1100 | 850 | 14 | 17 | -7.2 |
| | | | 1200 | 605 | 15 | 20 | -5.0 |
| | | | 1300 | 420 | 13 | 18 | -5.1 |
| | | | 1450 | 280 | 11 | 18 | -5.3 |
| | SiO$_2$ (90) Bi$_2$O$_3$ (10) | | 1000 | 1220 | 13 | 20 | -7.7 |
| | | | 1100 | 870 | 14 | 25 | -4.1 |
| | | | 1200 | 605 | 16 | 35 | -2.9 |
| | | | 1300 | 450 | 16 | 35 | -2.9 |
| | | | 1450 | 300 | 14 | 30 | -3.5 |
| | SiO$_2$ (100) Bi$_2$O$_3$ (0) | | 1000 | 1250 | 12 | 20 | -7.0 |
| | | | 1100 | 900 | 14 | 25 | -5.1 |
| | | | 1200 | 615 | 15 | 30 | -3.5 |
| | | | 1300 | 470 | 14 | 23 | -3.7 |
| | | | 1450 | 330 | 14 | 20 | -4.0 |
| | Sb$_2$O$_3$ (30) Bi$_2$O$_3$ (70) | | 1000 | 1200 | 11 | 15 | -8.1 |
| | | | 1200 | 600 | 14 | 20 | -5.3 |
| | | | 1450 | 300 | 13 | 18 | -5.7 |
| | Sb$_2$O$_3$ (90) Bi$_2$O$_3$ (10) | | 1000 | 1190 | 13 | 28 | -4.1 |
| | | | 1200 | 603 | 15 | 35 | -2.7 |
| | | | 1450 | 285 | 14 | 30 | -3.3 |
| | Sb$_2$O$_3$ (100) | | 1000 | 1220 | 12 | 20 | -5.0 |
| | | | 1200 | 610 | 14 | 25 | -3.5 |
| | | | 1450 | 310 | 13 | 20 | -4.0 |
| | Bi$_2$O$_3$ (0) In$_2$O$_3$ (50) Bi$_2$O$_3$ (50) | | 1000 | 1200 | 12 | 15 | -7.5 |
| | | | 1200 | 595 | 14 | 20 | -5.7 |
| | | | 1450 | 320 | 12 | 18 | -6.0 |

Table 5

| Composition of Sintered Body (mol. %) | Solid Ingredient of Paste (mol. %) | | Sintering Temp. (°C) | C (V) (at 1 mA) | Electric Characteristics of Resultant Resistor | | Boiling Test ΔC(%) |
|---|---|---|---|---|---|---|---|
| | | | | | n 0.1–1 mA | Impulse Withstand | |
| ZnO (97.5)<br>Bi₂O₃ (0.5)<br>CoO (0.5)<br>MnO (0.5)<br>Sb₂O₃ (1.0) | In₂O₃<br>Bi₂O₃ | (90)<br>(10) | 1000<br>1200<br>1450 | 1230<br>600<br>295 | 13<br>15<br>15 | 25<br>35<br>25 | -4.7<br>-3.1<br>-3.6 |
| | In₂O₃<br>Bi₂O₃ | (100)<br>(0) | 1000<br>1200<br>1450 | 1200<br>610<br>305 | 14<br>14<br>14 | 25<br>30<br>30 | -5.1<br>-3.5<br>-4.0 |
| | SiO₂<br>Sb₂O₃<br>Bi₂O₃ | (72)<br>(20)<br>(8) | 1000<br>1100<br>1200<br>1300<br>1450 | 1250<br>910<br>620<br>430<br>300 | 14<br>15<br>17<br>16<br>15 | 35<br>40<br>45<br>40<br>40 | -3.6<br>-2.1<br>-1.7<br>-1.8<br>-2.3 |
| | SiO₂<br>Bi₂O₃ | (90)<br>(10) | 1000<br>1200<br>1450 | 3800<br>2040<br>1200 | 38<br>45<br>42 | 30<br>40<br>35 | -2.9<br>-1.5<br>-2.0 |
| | Sb₂O₃<br>Bi₂O₃ | (90)<br>(10) | 1000<br>1200<br>1450 | 3900<br>2010<br>1250 | 41<br>46<br>43 | 35<br>40<br>35 | -3.5<br>-2.5<br>-2.7 |
| | In₂O₃<br>Bi₂O₃ | (90)<br>(10) | 1000<br>1200<br>1450 | 4000<br>2015<br>1300 | 42<br>46<br>40 | 35<br>40<br>40 | -4.7<br>-3.1<br>-3.5 |
| | SiO₂<br>Sb₂O₃<br>Bi₂O₃ | (72)<br>(20)<br>(8) | 1000<br>1100<br>1200<br>1300<br>1450 | 4050<br>3200<br>2100<br>1550<br>1300 | 40<br>44<br>48<br>44<br>40 | 40<br>550<br>60<br>50<br>45 | -1.3<br>-0.9<br>-0.5<br>-1.1<br>-1.5 |

EXAMPLE 6

The mixtures of Table 6 were pressed and covered by coating paste comprising the same oxides as the additives in the body. The bodies were sintered in air for 5 hours. The test conditions were the same as those of Example 2. The electric characteristics of the resultant resistors are shown in Table 6. The excellent ability to withstand impulses and the small change with C-value were obtained by coating paste containing the same materials as the additives in the sintered body.

Size of disc; 32 mm in dia. and 20 mm in thickness
Thickness of high resistive layer; 30μ

Table 6

| Composition of Sintered body (mol. %) | | | Solid Ingredients of Paste (mol. %) | | Sintering Temp. (°C) | C(V) (at 1mA) | Electric Characteristics of Resultant Resistor | | Boiling Test ΔC (%) |
|---|---|---|---|---|---|---|---|---|---|
| ZnO | Bi₂O₃ | Further Additives | | | | | n 0.1–1mA | Impulse Withstand (KA) | |
| 99.5 | 0.5 | — | Bi₂O₃ | 100 | 1200 | 4000 | 4.1 | 10 | -7.5 |
| 99.5 | — | CoO 0.5 | CoO | 100 | 1200 | 2200 | 3.9 | 10 | -6.2 |
| 99.5 | — | MnO 0.5 | MnO | 100 | 1200 | 2600 | 3.4 | 10 | -5.3 |
| 99.5 | — | Sb₂O₃ 0.5 | Sb₂O₃ | 100 | 1200 | 3000 | 3.7 | 12 | -6.2 |
| 99.5 | — | BaO 0.5 | BaO | 100 | 1200 | 1600 | 9.0 | 15 | -7.0 |
| 99.5 | — | SrO 0.5 | SrO | 100 | 1200 | 1500 | 7.8 | 12 | -8.3 |
| 99.5 | — | UO₂ 0.5 | UO₂ | 100 | 1200 | 2000 | 4.1 | 10 | -7.9 |
| 99.5 | — | PbO 0.5 | PbO | 100 | 1200 | 4000 | 4.3 | 12 | -7.1 |
| 99.0 | 0.5 | CoO 0.5 | Bi₂O₃(50)<br>CoO (50) | | 1200 | 600 | 15 | 22 | -3.5 |
| 99.0 | 0.5 | MnO 0.5 | Bi₂O₃(50)<br>MnO(50) | | 1200 | 1000 | 23 | 25 | -3.7 |
| 99.0 | 0.5 | Sb₂O₃ 0.5 | Bi₂O₃(50)<br>Sb₂O₃(50) | | 1200 | 985 | 8.3 | 18 | -4.2 |
| 99.0 | 0.5 | Bao 0.5 | Bi₂O₃(50)<br>BaO(50) | | 1200 | 820 | 11 | 20 | -3.3 |
| 99.0 | 0.5 | SrO 0.5 | Bi₂O₃(50)<br>Sro (50) | | 1200 | 800 | 12 | 20 | -3.7 |
| 99.0 | — | CoO 0.5<br>SnO 0.5<br>MnO 0.5 | CoO<br>SrO<br>MnO | 50<br>50<br>50 | 1200 | 4000 | 30 | 40 | -5.0 |
| 99.0 | — | BaO 0.5<br>BaO 0.5 | Bao<br>BaO | 50<br>50 | 1300 | 3500 | 30 | 35 | -4.7 |
| 99.0 | — | SrO 0.5<br>CoO 0.5 | SrO<br>Bi₂O₃ | 50<br>50 | 1100 | 2,000 | 20 | 30 | -3.3 |
| 98.0 | 1.0 | MnO 0.5<br>BaO 0.5 | CoO<br>MnO<br>Bi₂O₃ | 25<br>25<br>50 | 1200 | 1800 | 15 | 25 | -2.7 |
| 98.0 | 1.0 | SrO 0.5<br>CoO 0.5 | BaO<br>SrO<br>Bi₂O₃ | 25<br>25<br>20 | 1200 | 1650 | 14 | 20 | -3.5 |
| 97.5 | 0.5 | MnO 0.5<br>Sb₂O₃ 1.0 | CoO<br>MnO<br>Sb₂O₃ | 20<br>20<br>60 | 1200 | 2000 | 46 | 55 | -1.7 |
| 97.0 | 0.5 | CoO 0.5<br>MnO 0.5<br>Sb₂O₃ 1.0<br>SnO₂ 0.5<br>CoO 0.5 | Bi₂O₃<br>CoO<br>MnO<br>Sb₂O₃<br>SnO₂<br>Bi₂O₃<br>CoO | 10<br>10<br>10<br>40<br>30<br>10<br>10 | 1200 | 2600 | 50 | 60 | -0.5 |

Table 6

| Composition of Sintered body (mol. %) | | | | Solid Ingredients of Paste (mol. %) | | Sintering Temp. (°C) | C(V) (at 1mA) | Electric Characteristics of Resultant Resistor | | Boiling Test ΔC (%) |
|---|---|---|---|---|---|---|---|---|---|---|
| ZnO | $Bi_2O_3$ | Further Additives | | | | | | n 0.1–1mA | Impulse Withstand (KA) | |
| 97.0 | 0.5 | MnO | 0.5 | MnO | 10 | 1200 | 2800 | 50 | 60 | -0.5 |
|  |  | $Sb_2O_3$ | 1.0 | $Sb_2O_3$ | 60 |  |  |  |  |  |
|  |  | $Cr_2O_3$ | 0.5 | $Cr_2O_3$ | 10 |  |  |  |  |  |
|  |  | CoO | 0.5 | $Bi_2O_3$ | 10 |  |  |  |  |  |
|  |  | MnO | 0.5 | CoO | 5 |  |  |  |  |  |
| 96.5 | 0.5 | $Sb_2O_3$ | 1.0 | MnO | 5 | 1200 | 4400 | 55 | 70 | -0.3 |
|  |  | $Cr_2O_3$ | 0.5 | $Sb_2O_3$ | 25 |  |  |  |  |  |
|  |  | $SiO_2$ | 0.5 | $Cr_2O_3$ | 5 |  |  |  |  |  |
|  |  |  |  | $SrO_2$ | 50 |  |  |  |  |  |
|  |  | CoO | 0.5 | $Bi_2O_3$ | 5 |  |  |  |  |  |
|  |  | MnO | 0.5 | CoO | 5 |  |  |  |  |  |
| 94.0 | 0.5 | $Sb_2O_3$ | 1.0 | MnO | 5 |  |  |  |  |  |
|  |  |  |  | $Sb_2O_3$ | 20 | 1200 | 5600 | 60 | 70 | -0.3 |
|  |  | $Cr_2O_3$ | 0.5 | $Cr_2O_3$ | 3 |  |  |  |  |  |
|  |  | $SiO_2$ | 2.0 | $SiO_2$ | 60 |  |  |  |  |  |
|  |  | NiO | 1.0 | NiO | 2 |  |  |  |  |  |
|  |  | CoO | 0.5 | $Bi_2O_3$ | 25 | 1000 | 3800 | 35 | 35 | -1.2 |
| 98.0 | 0.5 | MnO | 0.5 | CoO | 25 | 1200 | 1800 | 40 | 50 | -0.8 |
|  |  |  |  | MnO | 25 |  |  |  |  |  |
|  |  | $Sb_2O_3$ | 0.5 | $Sb_2O_3$ | 25 | 1450 | 850 | 41 | 40 | -1.3 |

What we claim is:

1. A voltage dependent resistor comprising a zinc oxide sintered body itself having voltage dependent properties, a covering layer on the side surface of said body having a thickness of more than $10\mu$, the portion of said covering layer up to a depth of $3\mu$ from the side surface being comprised of more than 70 mole % of at least one member selected from the group consisting of zinc silicate ($Zn_2SiO_4$) and zinc antimonate ($Zn_7Sb_2O_{12}$), and two electrodes applied to the opposite end surfaces of said body.

2. A voltage dependent resistor according to claim 1, in which said zinc oxide sintered body consists essentially of, as a major part, 99.9 to 80.0 mole percent of zinc oxide, and, as an additive, 0.05 to 10.0 mole percent of bismuth oxide ($Bi_2O_3$) and 0.05 to 10.0 mole percent, in total, of at least one member selected from the group consisting of cobalt oxide (CoO), manganese oxide (MnO), antimony oxide ($Sb_2O_3$), barium oxide (BaO), strontium oxide (SrO) and lead oxide (PbO).

* * * * *